L. E. ADAMS.
VEGETABLE CUTTER.
APPLICATION FILED OCT. 11, 1916.

1,230,640.

Patented June 19, 1917.

Witness
R. E. Rousseau
I. Wilcox

Inventor
Louis E. Adams.
By Victor J. Evans
Attorney

UNITED STATES PATENT OFFICE.

LOUIS E. ADAMS, OF RAVEN, ALBERTA, CANADA.

VEGETABLE-CUTTER.

1,230,640.  Specification of Letters Patent.  Patented June 19, 1917.

Application filed October 11, 1916. Serial No. 125,057.

*To all whom it may concern:*

Be it known that I, LOUIS E. ADAMS, a subject of the King of Great Britain, residing at Raven, in the Province of Alberta and Dominion of Canada, have invented new and useful Improvements in Vegetable-Cutters, of which the following is a specification.

This invention relates to vegetable slicers and it consists in the novel features hereinafter described and claimed.

An object of the invention is to provide a vegetable slicer of simple and durable structure comprising a table having an opening in the top thereof with a disk journaled for rotation upon the table and detachable therefrom. The said disk carries suitable cutting knives and means are provided for rotating the disk. A receptacle is detachably mounted upon the table and is adapted to contain vegetables to be sliced.

A follower is located in the receptacle and presses the vegetables toward the knives whereby the slices are evenly cut and passed through the openings in the top of the table and may fall into a pan or other receptacle provided for their reception.

In the accompanying drawings:—

Figure 1:
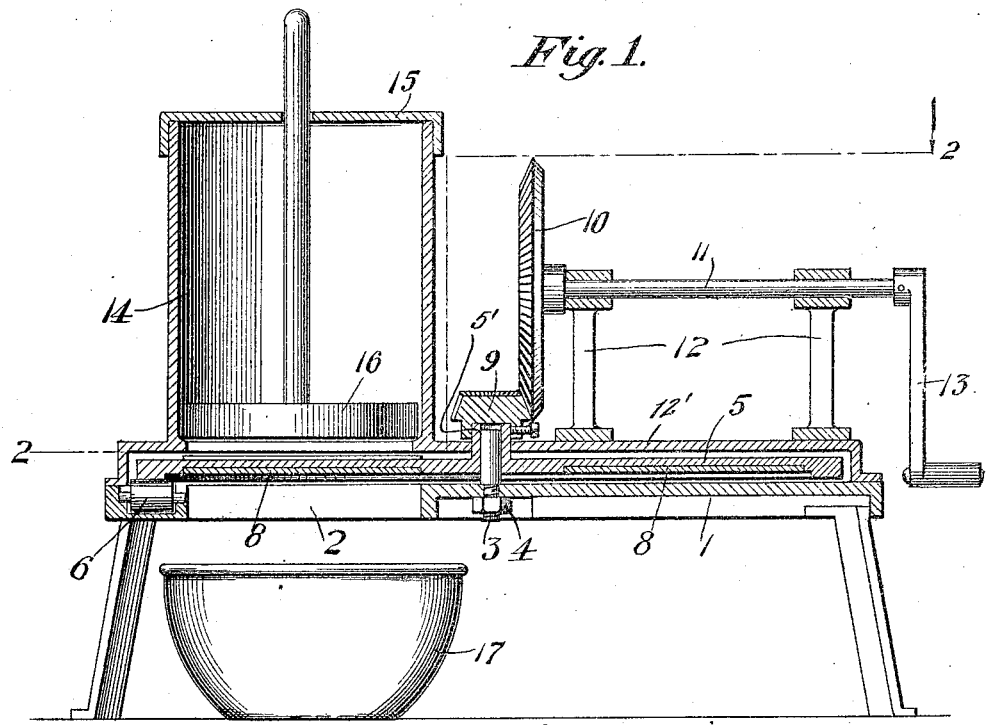
Figure 1 is a side elevation of the vegetable slicer.
Figure 2:
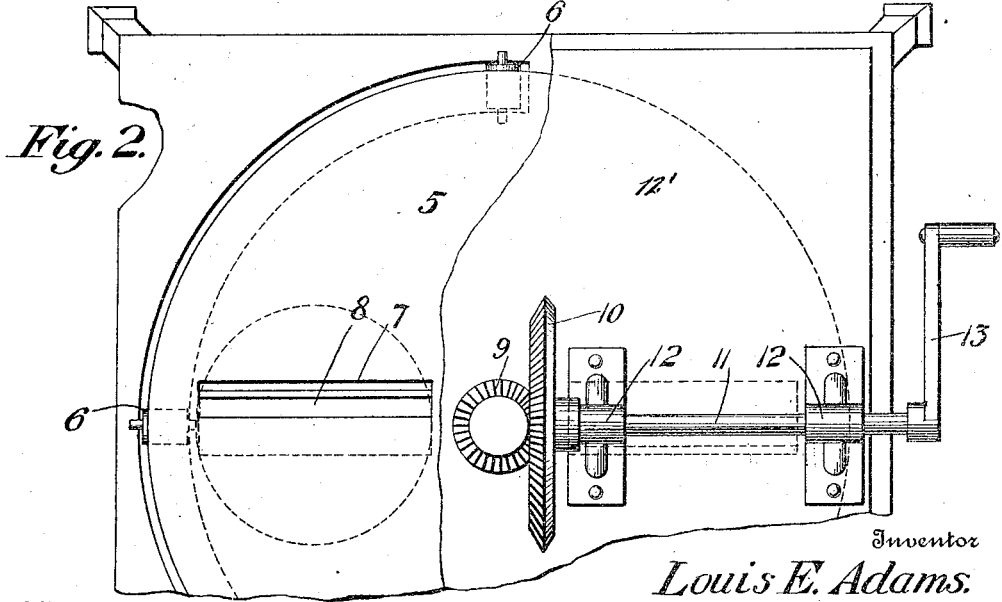
Fig. 2 is a top plan view of the same.

The vegetable slicer comprises a table 1 having an opening 2 in the top thereof. A shaft 3 is mounted on the top of the table 1 and passes transversely through the same. A nut 4 is screwed upon the lower end of the shaft 3 and serves as means for holding the shaft in position in the top of the table. A disk 5 is provided with a sleeve 5' which is journaled on the shaft 3 and is located above the upper surface of the top of the table. The edge portions of the disk 5 rest upon the rollers 6 which are journaled upon the top of the table. The said disk 5 is provided with openings 7 over which are located cutting knives 8. A pinion 9 is fixed to the upper end of the sleeve 5' and meshes with a pinion 10 mounted upon a shaft 11. The shaft 11 is journaled for rotation in suitable standards 12 mounted on a panel 12' which rests at its edges upon the top of the table 1. A crank handle 13 is mounted upon the end of the shaft 11. It will be seen that by using the crank handle 13 and rotating the shaft 11 rotary movement is transmitted through the intermeshing pinions 10 and 9 to the sleeve 5' whereby the disk 5 is rotated and the knives 8 are carried over the openings 2 in the top of the table 1.

A receptacle 14 is mounted upon the panel 12' at a point above the opening 2 in the top of the table 1 and is provided with a detachable cover 15. A follower 16 is located in the receptacle 14. In operation the cover and follower are removed from the receptacle 14 and the vegetables to be sliced are deposited therein. The follower is then placed on top of the vegetable and the cover 15 is applied to the top of the receptacle. The said receptacle holds the vegetables above the path of movement of the knives 8 consequently as the said knives 8 come in contact with the vegetables they cut slices therefrom which gravitate through the openings 2 in top of the table 1 and may fall into a pan 17 or other suitable receptacle located below the table top and provided for their reception.

From the foregoing description taken in conjunction with the accompanying drawing, it will be seen that a vegetable slicer of simple and durable structure is provided and that the same may be easily and quickly operated to cut vegetables into slices preparatory to cooking or other purposes.

Having described the invention what is claimed is:—

A cutter comprising a table provided with an opening, a shaft fixed to the table, a disk having an upstanding centrally located sleeve which is journaled on the shaft, said disk also having openings, knife blades mounted at the openings in the disk, rollers journaled upon the table and supporting the edge portions of the disk, a panel mounted on the table over the disk and supporting a receptacle above the openings in the table, said panel having an opening through which said sleeve passes and means mounted on the panel for rotating the disk and being detachably connected with the sleeve.

In testimony whereof I affix my signature.

LOUIS E. ADAMS.

Copies of this patent may be obtained for five cents each, by addressing the "Commissioner of Patents, Washington, D. C."